(12) United States Patent
Schmitt

(10) Patent No.: US 6,286,578 B1
(45) Date of Patent: Sep. 11, 2001

(54) PROCESS AND DEVICE FOR INFLATING A TIRE

(75) Inventor: Ludovic Schmitt, Sayat (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 09/507,133

(22) Filed: Feb. 18, 2000

(30) Foreign Application Priority Data

Feb. 19, 1999 (FR) .................................................. 99 02147

(51) Int. Cl.[7] ....................................................... B27H 7/00
(52) U.S. Cl. ................................. 157/1; 157/1.1; 157/1.11
(58) Field of Search ................................. 157/1, 1.1, 1.11

(56) References Cited

U.S. PATENT DOCUMENTS 3,552,469 * 1/1971 Corless .
5,072,765 12/1991 Kane et al. .
5,456,302 * 10/1995 Demers .

FOREIGN PATENT DOCUMENTS 888537 8/1981 (BE) .

* cited by examiner

Primary Examiner—Joseph J. Hail, III
Assistant Examiner—Willie Berry, Jr.
(74) Attorney, Agent, or Firm—Baker Botts L.L.P.

(57) ABSTRACT

A process and device for inflating a tire by forming, within an enclosure in which there are enclosed the rim and the beads of the tire, an inflation orifice between a first seat of the rim and a first bead, then introducing compressed air into said orifice and closing it such that the tire is inflated and mounted hermetically on the rim. Before forming this orifice, the first bead of the tire is located axially to the outside of the first seat and the second bead is mounted hermetically on the second seat, then, to form the orifice, points on the first bead are pressed. The device for implementing the process includes a bell formed of a fixed part and a mobile part intended to slide relative thereto to tightly surround the tire on the rim for its inflation, and including, within the bell, a finger for pressing at points on said bead.

9 Claims, 2 Drawing Sheets

PROCESS AND DEVICE FOR INFLATING A TIRE

BACKGROUND OF INVENTION

The present invention relates to a process and device for inflating a tire. The invention applies to the inflation of a tire, the beads of which are respectively intended to be mounted on peripheral seats of a special rim, this inflation being effected without using the valve of said rim.

The structure of this rim is described in detail in U.S. Pat. No. 5,836,366.

As can be seen in FIG. 1, to which reference will be made hereafter, said rim 10 comprises, starting from its peripheral edges formed of two projections 11 and 12, a first and a second seat 13 and 14 inclined towards the outside and intended respectively to receive a first and a second bead 21 and 22 of the tire 20. Between the seats 13 and 14 there is provided, firstly, a bearing surface 15 intended to receive a bearing support 23 for the tread 24 and, secondly, a mounting groove 16 connecting the bearing surface 15 to an axially inner flange 17 of said first seat 13.

In the Test of the present description, by convention the seat which is adjacent to the groove 16 will be referred to as the first seat 13, and the seat which is on the opposite side from said groove 16 will be referred to as the second seat 14.

As for the axially outer flange of each seat 13, 14, it is formed by the corresponding peripheral projection 11, 12.

In known manner, the tire 20 is mounted on this special rim 10 in the following manner.

The first bead 21 is presented on the rim 10, on the side of the second seat 14, then this first bead 21 is slid axially over the bearing surface 15 so as to introduce it into the groove 16. Then the second bead 22 is mounted on the second seat 14.

Then, in an extraction step, the first bead 21 is extracted from the groove 16 so as to bring it axially against the outside of the projection 11 of the first seat 13.

Finally, in a mounting stage, this first bead 21 is mounted on the first seat 13.

Among the devices for inflating without using a valve which are known to date, mention may be made in particular of the device described in German Patent Specification DE-A-3 411 433, which comprises a bell formed of a cover of an upturned U-shaped cross-section. This bell is intended to be mounted hermetically in one of the sidewalls of a tire which has beforehand been mounted on the seats of a rim and which lies with its other sidewall flat on a horizontal support, also hermetically.

This rim comprises said seats on its inner face, and these seats are connected together by a planar central portion which is extended by two kinked sections directed towards the inside of the rim. Each seat is axially delimited, on the inner face of the rim, by one of said kinked sections and by a peripheral projection which forms an axial end of the rim and which is also directed towards the inside thereof, such that these seats are symmetrical to each other relative to said central portion.

When the tire is wedged between said support and said bell, the beads of the tire are thus mounted on said seats.

The bell is provided, within its internal space and close to its side wall, with four sliding means which may possibly also be pivoting means, such as levers, which are provided to bear on the upper bead located opposite the bell, so as to bring it towards the lower bead and thus to form an annular space between this upper bead and the rim, around the entire periphery of said bead.

Following the formation of this space, the tire is inflated by injecting compressed air into the bell and, consequently, between the tire and the rim via said space. Then said bearing means are caused to slide in the opposite direction, the effect of which is to reposition said upper bead on the corresponding seat, and the injection of compressed air into the bell is terminated, such that the tire is in the inflated state.

Mention may also be made, among the valve-less mounting devices, of those described in German Patent Specification DE-A-3 423 307 and in Belgian Patent Specification BE-A-888 537, which differ essentially from the former in that the bearing means which each of them comprises are formed by the cylindrical side wall itself of the corresponding bell, which is provided to be able to slide axially, that is to say, parallel to the axis of revolution of the tire.

One major disadvantage of these known inflation devices is that they are not suitable for inflating a tire mounted on a rim, such as the special rim described in the aforementioned U.S. Pat. No. 5,836,366, because, once said first bead of the tire has been mounted on said first seat of this special rim, the axially inner flange of this first seat and the aforementioned inclination of the latter towards the outside would hinder the circumferential deformation of this first bead towards said second bead, for creating said annular space.

SUMMARY OF THE INVENTION

The object of the present invention is to propose a process for inflating a tire and a device for implementing this process, which, in good conditions and in a reduced time, permit a tire to be inflated in relation with said special rim, which are thus defined:

this tire comprises beads respectively intended to be mounted on seats of a rim, there being provided between said seats, on one hand, a bearing surface intended to receive a bearing support for a tread and, on the other hand, a mounting groove connecting said bearing surface to an axially inner flange of one of said seats, or first seat, each seat being provided axially to the outside with a peripheral projection.

The inflation process according to the invention consists in forming an airtight enclosure, part of the wall of which is formed by said tire and within which there are enclosed said rim and said beads, then forming within said enclosure an inflation orifice between said first seat and one of said beads, or first bead, then introducing compressed air into said inflation orifice via said enclosure, then closing said orifice at the end of the inflation such that said tire is inflated and mounted hermetically on said rim.

According to the invention, said inflation process is characterized in that it consists, before forming said inflation orifice, in using said tire such that said first bead occupies an extraction position in which it is axially to the outside of said first seat and that the other bead, or second bead, is mounted in airtight manner on the other seat, or second seat, then, for forming said inflation orifice, pressing within said enclosure on a pinpoint location of the circumference of said first bead, then, for closing said orifice, ceasing pressure on said pinpoint location.

A device according to the invention for performing said process comprises a bell intended to be supplied with compressed air and formed of a fixed part and a mobile part intended to slide relative to the former, said parts being intended, respectively, to surround tightly in hermetically manner the sidewalls of said tire which is provided with said rim for its inflation.

According to the invention, said device is characterized in that it comprises, within said bell, a finger which is intended to exert an axial force at points on said first bead by means of its free end, in order to form an inflation orifice between said first bead and said first rim seat.

According to another characteristic of the invention, said inflation device is such that said finger is mounted to be mobile on the side of said fixed part and in translation parallel to the axis of sliding of said mobile part, under the control of a control element, such as a piston-cylinder unit.

Preferably, said finger has set back from its free end a shoulder, which is intended to bear on the outer face of said peripheral projection of the rim, such that the maximum amplitude of said translation is predetermined.

Preferably, said fixed part has a geometry of revolution which is concentric to said axis of sliding of said mobile part, and it is intended to bear with its peripheral edge on a circular zone of said sidewall.

Advantageously, said peripheral edge of said fixed part has, on an arc of its circumference, a portion slightly extending said edge by kinked sections beyond the remainder of said circumference, in the direction of said mobile part.

In this case, said finger is provided in an angular sector defined by a dihedron having said axis as its ridge and the faces of which pass respectively through said kinked sections.

According to another characteristic of the invention, said mobile part is provided with two annular, concentric wedges which are intended respectively to bear on the rim and on the tire.

In this manner, said fixed part can tightly surround said envelope in hermetic manner.

According to another characteristic of the invention, said inflation device comprises, within said bell, a mounting roller which is intended to bear on at least one arc of the circumference of said first bead, at the end of said inflation, so as to mount it on said first seat.

According to one example of embodiment, said mounting roller is mounted on the free end of an arm which is mobile in planar rotation about said axis, at various heights relative to said axis.

The aforementioned characteristics of the present invention, as well as others, will be better understood from reading the following description of an example of embodiment of the invention, which is given by way of illustration but not of limitation, said description being given in relation with the attached drawings.

DESCRIPTION OF PREFERRED EMBODIMENTS

Figure 1:
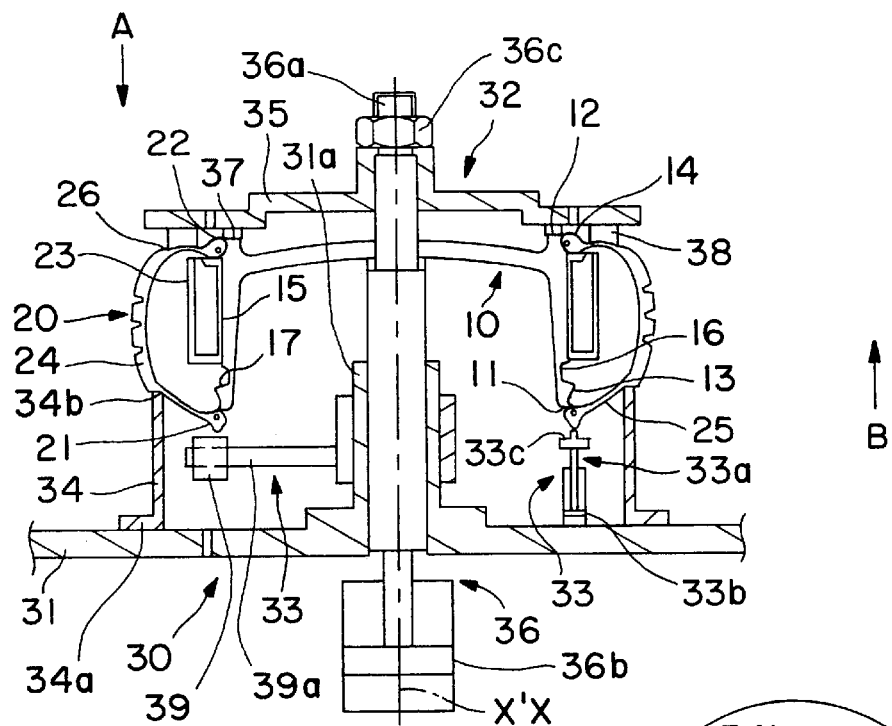
FIG. 1 is a diagrammatic section of an inflation device according to the invention in a first phase of the corresponding process.

As can be seen in FIG. 1, an inflation device 30 according to the invention comprises a frame 31, a bell 32 which is mounted on the frame 31 and which is intended to cooperate with the tire 20 and the special rim 10, and means 33 which are mounted within the bell 32 and which are intended to cooperate with the first bead 21 of the tire 20.

The wall of the frame 31 is provided with an air inlet (not shown) which is connected hermetically to a compressed-air supply system.

In this example of embodiment, the bell 32 is formed of a fixed part 34 which is mounted on the frame 31 and a mobile part 35 which is provided to slide relative to the former by means of a control means 36.

These parts 34 and 35 are intended, respectively, to surround the sidewalls 25 and 26 of the casing 20 hermetically for the purpose of inflation thereof, when said tire is provided with said rim 10.

The fixed part 34 has a geometry of revolution, for example of cylindrical shape extended at a right-angle by a base 34a, for fixing it to the frame 31.

Figure 1A:
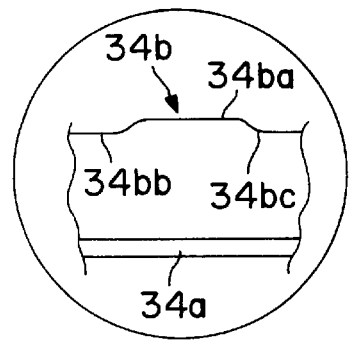
FIG. 1a is an inset view showing an elevation of a detail of the device of FIG. 1.

Preferably, the peripheral edge 34b of said fixed part 34 which is distal to said base 34a has, on a reduced arc of its circumference, a portion 34ba slightly extending said edge 34b beyond the rest of said circumference in the direction of said mobile part 35 (see the inset view of FIG. 1a). It can be seen in this FIG. 1a that this portion 34ba may be of substantially planar shape, and that it is, for example, connected to the rest of the circumference 34bb by two kinked sections 34bc which are symmetrical to each other and more of less curved.

The mobile part 35 is intended to exert, by means of the fixed part 34, an axial clamping force on the tire 20 and on the rim 10 (see arrow A), the clamping intensity of which is controlled by the control means 36. This part 35 has a wall which is overall perpendicular to that of the fixed part 34 and, in this example of embodiment, it is mounted to slide in its axis of symmetry X'X on said control means 36 (it can be seen in FIG. 1 that the fixed part 34 is concentric to said axis X'X).

This means 36 is formed here of a piston-cylinder unit, the rod 36a of which may be guided in both directions within a sleeve 31a extending, on the side of the fixed part 34, the edge of an opening in the frame 31, and the shank 36b of which is provided on the other side of same frame 31. The rod 36a of the piston-cylinder unit 36 is provided with an element 36c, such as a bolt, which is provided for locking it at a given stroke.

The mobile part 35 is provided, close to the periphery of its face opposite the fixed part 34, with two concentric annular wedges 37 and 38 of sections which are for example rectangular, which are intended respectively to bear on the rim 10 and on the tire 20. More precisely, the wedge 37 associated with the rim 10 is intended to bear on the outer face of the peripheral projection 11 of said rim 10. As for the wedge 38 associated with the tire 20, it is, firstly, located between said wedge 37 and the periphery of the mobile part 35 and, secondly, it extends said mobile part 35 in the direction of the fixed part 34 slightly beyond the wedge 37, so as to be able to bear on the sidewall 26 of the tire 20 which ends in the second bead 22.

The means 33 intended to cooperate with the first bead 21 of the tire 20 are formed, firstly, of a finger 33a which is intended to exert at points an axial force on the first bead 21 by means of its free end (see arrow B) in order to form an inflation orifice for the tire 20 and, secondly, a mounting roller 39 which is intended to bear on at least one arc of the circumference of said first bead 21, at the end of said inflation.

In the example of FIG. 1, the finger 33a is mobile in both directions in translation parallel to the axis X'X, under the control of a control element 33b, such as a second piston-cylinder unit which is mounted on the frame 31. This finger 33a advantageously has a shoulder 33c set back from its free end. This shoulder 33c is intended to bear on the outer face of the peripheral projection 12 of the rim 10, such that the maximum stroke of said second piston-cylinder unit and, consequently, the maximum amplitude of said translation are predetermined.

In the event that the peripheral edge 34b of the fixed part 34 has the aforementioned kinked section on an arc of the circumference in relation with FIG. 1a, it will be noted that the finger 33a is then provided in the angular sector defined by a dihedron having as its ridge the axis X'X and the faces of which pass respectively through said kinked sections 34bc.

As for the mounting roller 39, it is mounted on the free end of an arm 39a which is mobile in planar rotation about the axis X'X, and at various heights relative to said axis X'X.

Advantageously, it will be noted that the inner space of the bell 32 on the outside of which the rim 10 provided with the tire 20 is intended to be mounted may be partially occupied, in order to reduce the volume of air necessary for inflating said tire 20. According to one example of embodiment, to this end an element of revolution of annular structure (not shown) may be used which is mounted on said frame 31, centered on the axis X'X.

An inflation device 30 according to the present invention function s in the following manner.

In a first stage, the result of which is illustrated in FIG. 1, the rim 10 integrally provided with the tire 20 is arranged in the extraction position, flat on the fixed part 34 of the bell 32 and on a predetermined side.

More precisely, this flat arrangement is such that the axis of revolution common to the tire 20 and to the rim 10 is merged with said axis of symmetry X'X of the device 30.

As for this extraction position, it was obtained at the end of said extraction stage described above, and it is such that the first bead 21 of the tire is located axially to the outside of the projection 11 of the first seat 13, the second bead 22, for its part, being mounted on the second seat 14. In this position, the first bead 21 bears virtually hermetically on said projection 11

As for said predetermined side being arranged flat on the fixed part 34, this is the side of the tire 20 which comprises the first bead 21 in the extraction position.

As can be seen in FIG. 1, the tire 20 is then mounted on the peripheral edge 34b of the fixed part 34 by means of a circular zone of its sidewall 25.

It will be noted that the implementation of this first step requires, firstly, the mobile part 35 of the bell 32 to occupy a position sufficiently distant from said edge 34b relative to the latter and, secondly, the means 33 intended to cooperate with the first bead 21 to occupy positions sufficiently distant from said edge 34b moving away from said mobile part 35.

In a second stage, the result of which is also illustrated in FIG. 1, first of all the element 36c is actuated so as to form a stop for the mobile part 35. Then the approach of said mobile part 35 is controlled by the means 36 until a given position thereof is reached on the axis X'X, such that the wedges 37 and 38 of said mobile part 35 then bear respectively on the outer face of the peripheral projection 11 of said rim 10 and on said sidewall 26 of the tire 20.

More precisely, action is taken such that at least one of the wedges 37 and 38 bears hermetically on the rim 10 or on the tire 20. Preferably, this sealing is effected by said wedge 37 on the rim 10.

There has thus been formed an airtight enclosure 20, 32, part of the wall of which is formed by the tire 20 and within which are enclosed the rim and the beads 21 and 22.

Figure 2:
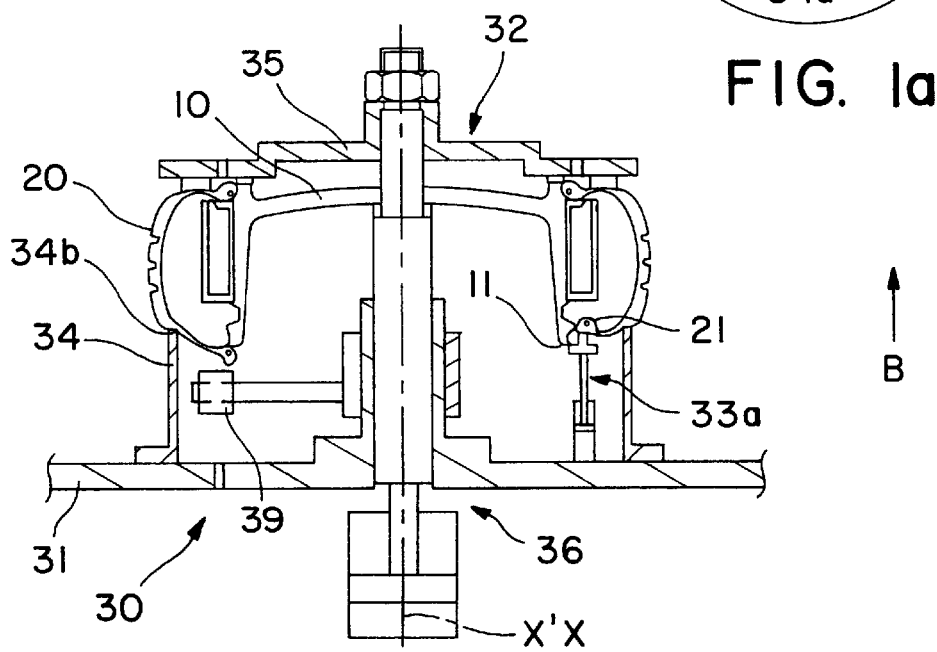
FIG. 2 is a diagrammatic section of said inflation device in a second phase of said process.

In a third stage, the result of which is illustrated in FIG. 2, the translation of the finger 33a in the direction of the arrow B is then controlled until its free end bears on the first bead 21, so as to bring the latter radially towards the outside and axially towards the inside of the projection 11 and thus to form said inflation orifice between the rim 10 and the tire 20.

Then compressed air is injected into the bell 32, the result of which is to introduce this air between the tire 20 and the rim 10, via said orifice.

It will be noted that the preferred kinked section of the peripheral edge 34b in said portion 34ba makes it possible, by bearing on an arc of the circumference of the sidewall 25 adjacent to the first bead 21, to facilitate the formation of this orifice to optimize later inflation.

Tests have shown that the action of the finger 33a on the first bead 21 makes it possible to increase the air pressure between the tire 20 and the rim 10 practically identically to what is in the remaining inner space of the bell 32, which minimizes any return of compressed air outside said orifice.

Figure 3:
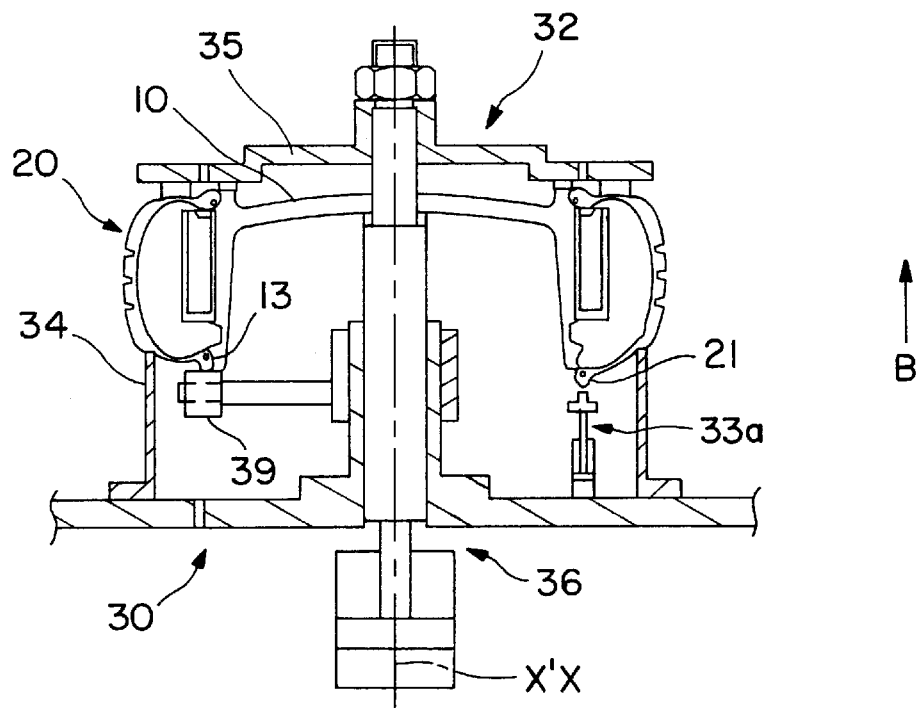
FIG. 3 is a diagrammatic section of said inflation device in a third phase of said process.

In a fourth stage, an initial phase of which is illustrated in FIG. 3, the translation of the finger 33a is controlled in the opposite direction to that of the arrow B until it occupies a retracted position similar to that of FIG. 1, where it no longer bears on the bead 21. The result of this is to close said inflation orifice and, consequently, to keep the compressed air between the rim 10 and the tire 20.

The injection of compressed air into the bell 32 is then terminated, and the roller 39 is actuated in translation so as to make it adopt an initial mounting position (see FIG. 3) where it bears locally on the first bead 21 opposite, so as to mount the latter locally on the corresponding seat 13.

It will be noted that, in the preferred embodiment in which the fixed part 34 has the aforementioned kinked section, said initial mounting position of said roller 39 is such that the latter is then on the inside of the angular sector defined by the aforementioned dihedron, following the example of the finger 33a.

In a fifth stage (see FIG. 4), the mounting roller 39 is actuated in rotation about the axis X'X over a given path, in said mounting position.

Experience shows that the rotation of the roller 39 in this mounting position over a path equal to or slightly less than one rotation is sufficient to mount the first bead 21 on the seat 13 intended to receive it, perfectly hermetically.

In this way, the tire 20 is mounted hermetically on the rim 10, while being inflated. This result is illustrated on the left-hand side of FIG. 4, where it can also be seen that after having controlled the stoppage of the rotation of the roller 39, it has been actuated in translation so that it regains on the axis X'X its initial height of retraction relative to the bead 21.

Then the compressed air contained in the bell 32 is withdrawn therefrom. It will be noted that this has no influence on the inflated state of the tire 20, owing to the hermetic mounting thereof on the rim 10.

Figure 4:
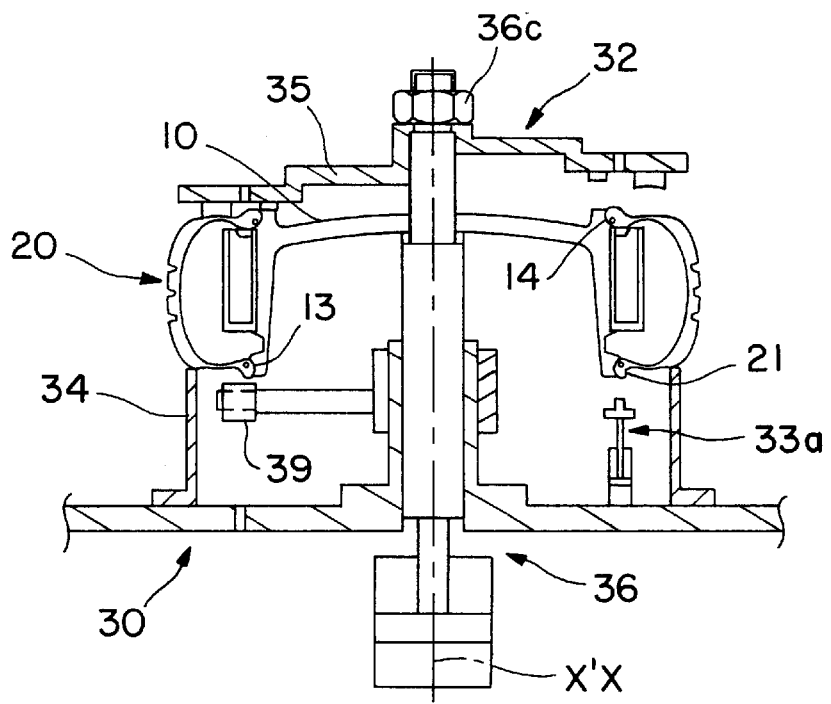
FIG. 4 is a diagrammatic section of said inflation device in a fourth phase of said process.

The right-hand side of FIG. 4 illustrates the withdrawal of the mobile part 35 of the bell 32, for extracting from the device 30 the assembly mounted in the inflated state of the tire 20 on the rim 10.

Preferably, this withdrawal of the mobile part 35 is carried out in two stages, by means of the control means 36 and by unlocking the element 36c.

First of all, this part 35 of the mounted assembly 10, 20 is slowly removed over only a few millimeters, so as to relax the force exerted thereby progressively. In a second step, the mobile part 35 of the mounted assembly 10, 20 can be removed in one operation by a height permitting the extraction of the latter.

It will be noted that the initial relaxation inherent in this first withdrawal step makes it possible to eliminate the risk of the beads sliding out of the corresponding seats 13 and 14, which could have occurred in the case of sudden withdrawal effected in a single stage.

It will also be noted that an inflation device 30 in accordance with the present invention makes it possible to inflate a tire 20 located in the non-mounted state on the rim 10 and also, at the end of this inflation, the assembly of said tire 20 on said rim 10.

I claim:

1. A process for inflating a tire having beads which are to be mounted on seats of a rim, there being provided between said seats a bearing surface intended to receive a bearing support for a tread and a mounting groove connecting said bearing surface to an axially inner flange of a first seat, each seat being provided axially to the outside with a peripheral projection, said process comprising forming an airtight enclosure, part of the wall of which is formed by said tire and within which there are enclosed said rim and said beads, forming within said enclosure an inflation orifice between said first seat and a first bead, introducing compressed air into said inflation orifice via said enclosure, closing said orifice at the end of the inflation such that said tire is inflated and mounted hermetically on said rim, characterized in that, before forming said inflation orifice, said tire is placed such that said first bead occupies an extraction position in which it is axially to the outside of said first seat and a second bead is mounted in airtight manner on the second seat, forming said inflation orifice by pressing within said enclosure on a pinpoint location of the circumference of said first bead, and closing said orifice by ceasing pressure on said pinpoint location.

2. An inflation device for a tire for implementing the process according to claim 1, said device comprising a bell intended to be supplied with compressed air and formed of a fixed part and a mobile part intended to slide relative to the former, said parts being intended, respectively, to surround tightly in hermetic manner the sidewalls of said tire which is provided with said rim for its inflation, characterized in that it comprises, within said bell, a finger which is intended to exert an axial force at points on said first bead by means of its free end, in order to form an inflation orifice between said first bead and said first rim seat.

3. An inflation device according to claim 2, characterized in that said finger is mounted to be mobile on the side of said fixed part and in translation parallel to the axis of sliding of said mobile part under the control of a piston-cylinder unit.

4. An inflation device according to claim 3, characterized in that said finger has set back from its free end a shoulder which bears on the outer face of said peripheral projection of the rimn, such that the maximum amplitude of said translation is predetermined.

5. An inflation device according to claim 2, characterized in that said fixed part has a geometry of revolution which is concentric to said axis of sliding of said mobile part, and in that it is intended to bear with its peripheral edge on a circular zone of side sidewall.

6. An inflation device according to claim 5, characterized in that said peripheral edge of said fixed part has, on an arc of its circumference, a portion slightly extending a ridge by kinked sections beyond the remainder of said circumference in the direction of said mobile part.

7. An inflation device according to claim 6, characterized in that said finger is provided in an angular sector defined by a dihedron having said axis as its edge and the faces of which pass respectively through said kinked sections.

8. An inflation device according to claim 2, characterized in that said mobile part is provided with two annular, concentric wedges which bear on said rim and on said tire.

9. An inflation device according to claim 2, characterized in that it comprises, within said bell, a mounting roller which bears on at least one arc of the circumference of said first bead, at the end of said inflation, so as to mount it on said first seat.

* * * * *

UNITED STATES PATENT AND TRADEMARK OFFICE
CERTIFICATE OF CORRECTION

PATENT NO.     : 6,286,578 B1
DATED          : September 11, 2001
INVENTOR(S)    : Ludovic Schmidt It is certified that error appears in the above-identified patent and that said Letters Patent is hereby corrected as shown below:

<u>Column 1,</u>
Line 23, "Test" should read -- rest --

<u>Column 8,</u>
Line 17, "rimn," should read -- rim, --
Line 23, "side" should read -- said --

Signed and Sealed this

Eighteenth Day of February, 2003

JAMES E. ROGAN
*Director of the United States Patent and Trademark Office*